(12) United States Patent
Scarisbrick et al.

(10) Patent No.: US 7,350,493 B2
(45) Date of Patent: Apr. 1, 2008

(54) DISTRIBUTOR FOR ENGINE WITH LASER IGNITION

(75) Inventors: Andy Scarisbrick, Brentwood (GB); Stephan Carroll, Wadhurst (GB); Robert Dodd, Clayton (GB); Tom Shenton, Manchester (GB); Geoff Dearden, Liverpool (GB); Steve Keen, Rugby (GB); Roy Clissold, Wickford (GB); John McCulloch, Wirral (GB)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 11/427,461

(22) Filed: Jun. 29, 2006

(65) Prior Publication Data

US 2007/0000465 A1 Jan. 4, 2007

(30) Foreign Application Priority Data

Jul. 1, 2005 (GB) .................................. 0513318.6

(51) Int. Cl.
F02P 23/04 (2006.01)
(52) U.S. Cl. .................................. 123/143 B
(58) Field of Classification Search ............. 123/143 B
See application file for complete search history.

(56) References Cited

U.S. PATENT DOCUMENTS 4,947,640 A * 8/1990 Few et al. ............... 123/143 B
6,428,307 B1 * 8/2002 Early et al. .............. 123/143 B
7,114,858 B2 * 10/2006 Gupta et al. ............. 123/143 B
2003/0210852 A1 11/2003 Chen et al.
2004/0168662 A1 * 9/2004 Wintner et al. ......... 123/143 B
2006/0037572 A1 * 2/2006 Yalin et al. .............. 123/143 B

FOREIGN PATENT DOCUMENTS

DE 3600279 7/1987
JP 63-253111 10/1988
JP 2004-138703 5/2004

* cited by examiner

Primary Examiner—Erick Solis
(74) Attorney, Agent, or Firm—Julia Voutyras

(57) ABSTRACT

A distributor is described for a multi-cylinder laser ignited internal combustion engine. The distributor includes a shaft rotatable by the engine and a plurality of flat reflective surfaces on the shaft. The surfaces lie in planes normal to the axis of rotation of the shaft and are axially staggered from one another along the length of the shaft. An optical transmitter directs light from a laser source to impinge at an angle sequentially on the reflective surfaces as the shaft rotates, and a plurality of optical receivers spaced from one another each receive the light reflected from a respective one of the mirror surfaces and direct the reflected light to a respective one of the engine cylinders.

5 Claims, 1 Drawing Sheet

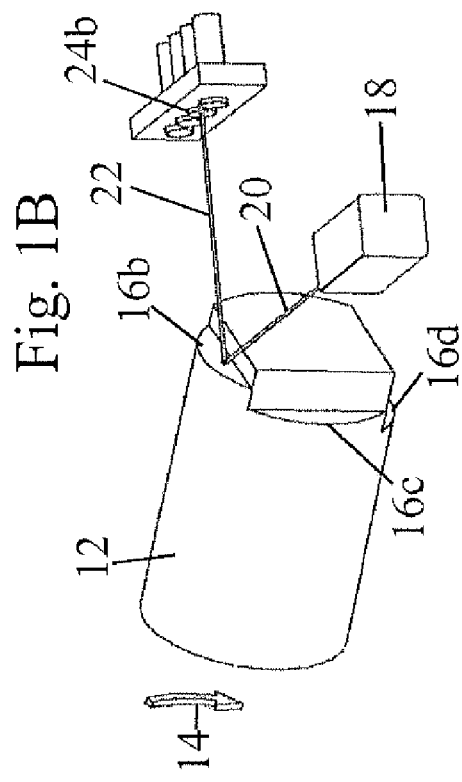
Fig. 1A
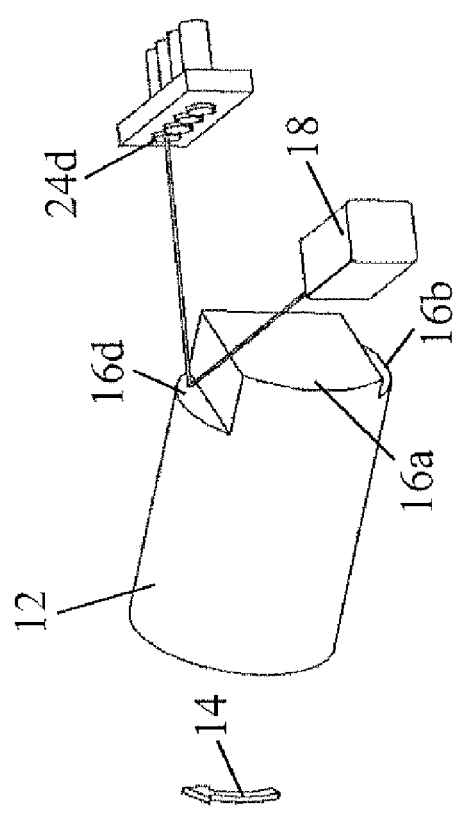
Fig. 1B
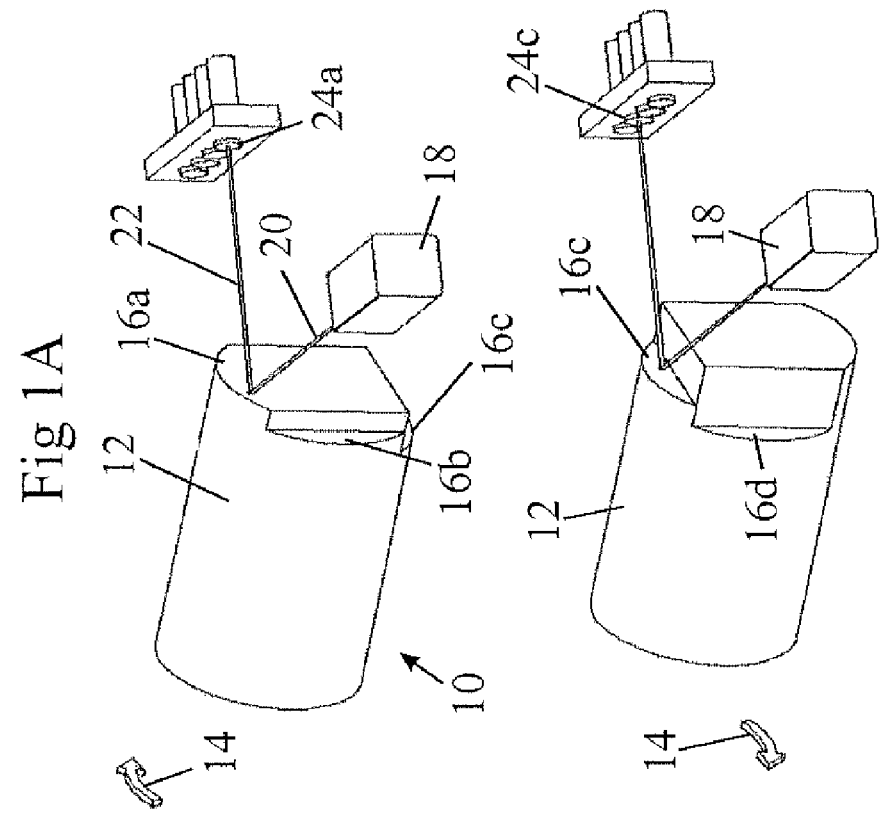
Fig. 1C
Fig. 1D

DISTRIBUTOR FOR ENGINE WITH LASER IGNITION

FIELD OF THE INVENTION

The present invention relates to an ignition system for an internal combustion engine, distributor for an engine with laser ignition.

BACKGROUND OF THE INVENTION

It has previously been proposed to user laser light instead of a spark to ignite the charge in an engine. In a spark ignited engine it is common to use a distributor to apply the high voltage pulses generated by a single ignition coil sequentially to the spark plugs of several cylinders. In the same way, if a multi-cylinder laser ignited engine is to use a single laser source to generate laser pulses for several cylinders, then a distributor is required to direct the output laser beam of the common laser source sequentially to the different combustion chambers.

As with spark ignition, the timing of the laser ignition pulses may be varied in relation to the crankshaft phase angle and accordingly the distributor must the capable of directing the beam of the laser light source to each of the cylinders over a wide range of crank shaft angles.

SUMMARY OF THE INVENTION

The present invention seeks to provide a simple, compact and robust distributor that meets the foregoing requirements.

According to the present invention, there is provided a distributor for a multi-cylinder laser ignited internal combustion engine, comprising a shaft rotatable by the engine, a plurality of flat reflective surfaces on the rotor which lie in planes normal to the axis of rotation of the shaft and are axially staggered from one another along the length of the shaft, an optical transmitter for directing light from a laser source to impinge at an angle sequentially on the reflective surfaces as the shaft rotates, and a plurality of optical receivers spaced from one another for each to receive the light reflected from a respective one of the mirror surfaces and to direct the reflected light to a respective one of the engine cylinders.

The optical transmitters and receivers may be optical fibres or lens systems designed such that substantially all the light emitted by the laser source is received after reflection by a respective one of the reflective surfaces by a single one of the receivers.

Each of the receivers is preferably connected by a fibre optic cable to an optically transparent window in a respective one of the engine cylinders.

The reflective surfaces are preferably polished mirrors but it is alternatively possible to employ prisms and to rely upon total internal reflection at one of the surfaces of the prism.

BRIEF DESCRIPTION OF THE DRAWINGS

The invention will now be described further, by way of example, with reference to the accompanying drawings, wherein:

FIGS. 1A to 1D show an optical distributor of the invention in different positions of the rotor shaft.

DETAILED DESCRIPTION OF THE PREFERRED EMBODIMENT

The drawings show an optical distributor 10 for a four cylinder internal combustion engine. The distributor 10 comprises a cylindrical rotor 12 rotatable about its axis in the manner represented by arrows 14. At its axial end, the rotor has four segment shaped reflective surfaces 16a to 16d. Other shapes, such as sectors, may alternatively be used. The planes of all four of the reflective surfaces 16a to 16d are normal to the axis of rotation of the rotor 12 and the four surfaces 16a to 16d are axially staggered along the length of the rotor 12.

An optical transmitter 18 serves to direct a laser beam 20 from a laser light source towards one of the reflective surfaces 16a to 16d, the beam falling at an angle on the four reflective surfaces sequentially as the rotor 12 is rotated by the engine.

Four spaced optical receivers 24a to 24d are provided to intercept the light beam 22 reflected by the respective surfaces 16a to 16d. Because the reflective surfaces 16a to 16d are axially spaced from one another, the reflected beam 22 will impinge on a different one of the four receivers 24a to 24d depending upon the surfaces 16a to 16d by which it was reflected. In this way, as the rotor 12 is driven by the engine, the light from the source 18 will be distributed sequentially to the four receivers 24a to 24d each of which is arranged to relay the laser light to a respective one of the engine cylinders.

The optical transmitter 18 and the optical receivers 24a to 24d are fibres or lens systems designed to ensure that substantially all the laser light emitted from the source and reflected by one of the surfaces 16a to 16d is received by the associated cylinder with a minimum of attenuation. The receivers 24a to 24d may typically be connected by optic fibres to focussing lenses prior to entering the combustion chambers of the cylinders.

Because of the segment or sector shape of the reflectors 16a to 16d, the optical path between the transmitter 18 and each of the receivers 24a to 24d is effective over an angle of rotation of the rotor 12 greater than sixty degrees. The timing of the laser pulse may therefore be varied within wide limits without affecting the performance of the optical distributor.

It will be appreciated that various modifications may be made to the illustrated embodiment without departing from the scope of the claims as set out in the appended claims. For example, instead of mirror surfaces one could use right angle prisms for the individual reflectors relying on total internal reflection to direct the laser beam to the different receivers. One may of course also have a different number of reflectors.

The invention claimed is:

1. A distributor for a multi-cylinder laser ignited internal combustion engine, comprising a shaft rotatable by the engine, a plurality of flat reflective surfaces on the rotor which lie in planes normal to the axis of rotation of the shaft and are axially staggered from one another along the length of the shaft, an optical transmitter for directing light from a laser source to impinge at an angle sequentially on the reflective surfaces as the shaft rotates, and a plurality of optical receivers spaced from one another for each to receive the light reflected from a respective one of the mirror surfaces and to direct the reflected light to a respective one of the engine cylinders.

2. A distributor as claimed in claim 1, wherein the optical transmitters and receivers are optic fibres or lens systems designed such that substantially all the light emitted by the laser source is received after reflection by a respective one of the reflective surfaces by a single one of the receivers.

3. A distributor as claimed in claim 2, wherein each of the receivers is connected by a fibre optic cable to an optically transparent lens system in a respective one of the engine cylinders.

4. A distributor as claimed in claim 3, wherein the reflective surfaces are silvered mirrors.

5. A distributor as claimed in claim 3, wherein the reflective surfaces are surfaces of prisms at which light undergoes total internal reflection.

* * * * *